United States Patent
Carman et al.

(10) Patent No.: US 10,941,335 B2
(45) Date of Patent: Mar. 9, 2021

(54) FINES FIXING AGENT HAVING IMPROVED COMPATIBILITY WITH ORGANIC COMPLEXED BORATE FRACTURING FLUIDS

(71) Applicant: Baker Hughes, a GE company, LLC, Houston, TX (US)

(72) Inventors: Paul S. Carman, Spring, TX (US); D. V. Satyanarayana Gupta, The Woodlans, TX (US); Jennifer L. Cutler, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/420,317

(22) Filed: Jan. 31, 2017

(65) Prior Publication Data

US 2017/0218258 A1 Aug. 3, 2017

Related U.S. Application Data

(60) Provisional application No. 62/289,768, filed on Feb. 1, 2016.

(51) Int. Cl.
| | |
|---|---|
| *C09K 8/56* | (2006.01) |
| *C09K 8/62* | (2006.01) |
| *C09K 8/88* | (2006.01) |
| *C09K 8/68* | (2006.01) |
| *C09K 8/72* | (2006.01) |

(52) U.S. Cl.
CPC ............ *C09K 8/62* (2013.01); *C09K 8/56* (2013.01); *C09K 8/685* (2013.01); *C09K 8/725* (2013.01); *C09K 8/887* (2013.01)

(58) Field of Classification Search
CPC .......... C09K 8/805; C09K 8/80; C09K 8/685; C09K 8/62; C09K 8/68; C09K 8/536; C09K 8/512; C09K 2208/10; C09K 8/605; C09K 8/88; C09K 8/90; C09K 8/92; C09K 8/514; C09K 8/516; C09K 8/602; C09K 8/887; C09K 8/08; C09K 8/12; C09K 8/467; C09K 8/487; C09K 8/5045; C09K 8/584; C09K 8/84; C09K 11/06; C09K 8/035; C09K 8/206; C09K 8/508; C09K 8/524; C09K 8/703; C09K 8/706; C09K 8/882; C09K 8/94; C09K 8/528; C09K 8/56; C09K 8/604; C09K 8/64; C09K 8/665; C09K 8/70; C09K 8/725; C09K 8/82; E21B 43/267; E21B 21/003; E21B 43/26; E21B 37/00; E21B 47/06; E21B 47/1015; E21B 37/06; E21B 43/04; E21B 43/164; E21B 43/168
See application file for complete search history.

(56) References Cited

U.S. PATENT DOCUMENTS

| | | | | |
|---|---|---|---|---|
| 6,489,499 | B1 * | 12/2002 | King | C07F 7/1836 |
| | | | | 556/400 |
| 2003/0008778 | A1 | 1/2003 | Donaldson et al. | |
| 2005/0272612 | A1 | 12/2005 | Dawson et al. | |
| 2006/0166837 | A1 | 7/2006 | Lin et al. | |
| 2006/0211580 | A1 * | 9/2006 | Wang | C09K 8/32 |
| | | | | 507/209 |
| 2010/0163233 | A1 * | 7/2010 | Abad | C09K 8/506 |
| | | | | 166/276 |
| 2012/0325485 | A1 * | 12/2012 | Qu | C09K 8/528 |
| | | | | 166/312 |
| 2014/0034323 | A1 | 2/2014 | Dobson, Jr. et al. | |
| 2014/0194327 | A1 * | 7/2014 | Hutchings | C09K 8/685 |
| | | | | 507/214 |
| 2015/0060067 | A1 | 3/2015 | Dawson et al. | |

FOREIGN PATENT DOCUMENTS

| | | |
|---|---|---|
| WO | 99/52991 A1 | 10/1999 |
| WO | 2007/085983 A1 | 8/2007 |
| WO | 2010/076744 A1 | 7/2010 |
| WO | WO2015/152919 * | 10/2015 |
| WO | 2017/136337 A1 | 8/2017 |

OTHER PUBLICATIONS

European Patent Office; PCT International Search Report, Issued in Connection to PCT/US2017/015817; dated May 18, 2017; 4 pages; Europe.
European Patent Office; PCT Written Opinion of the International Searching Authority, Issued in Connection to PCT/US2017/015817; dated May 18, 2017; 5 pages; Europe.
European Patent Office; Communication Pursuant to Rules 161(1) and 162 EPC, issued in connection to counterpart application No. EP17704922.8; dated Sep. 21, 2018; 3 pages; Europe.
Lubkowska, Magdalena et al.; Listopad-Grudzien 2014 Tom LIX; Polimery: Czasopismo Poswiecone Chemii, Technologii i Przetworstwu Polimerow; Aminoalkyl Functionalized Siloxanes; Nov. 14, 2014; 6 pages.
Hill, R.M.; 6: Siloxane Surfactants; In: Robb I.D. (eds) Specialist Surfactants; Springer, Dordrecht; Chapman & Hall; 1997; 2 pages.

* cited by examiner

*Primary Examiner* — Kumar R Bhushan
(74) *Attorney, Agent, or Firm* — Greenberg Traurig LLP

(57) ABSTRACT

A fines-fixing agent that has improved compatibility with organic complexed borate fracturing fluids is disclosed. Existing fines fixing agents have a high concentration of unreacted caustic that results in a product pH of approximately 12. This high pH affects the crosslinker and the overall fracturing fluid system stability, promoting precipitation of the organic crosslinker. These effects can be mitigated by neutralizing the fines fixing agents with an acid such as hydrochloric or acetic acid to a pH of 6 or lower.

7 Claims, 9 Drawing Sheets

FINES FIXING AGENT HAVING IMPROVED COMPATIBILITY WITH ORGANIC COMPLEXED BORATE FRACTURING FLUIDS

RELATED APPLICATIONS

This application claims the benefit, and priority benefit, of U.S. Provisional Patent Application Ser. No. 62/289,768, filed Feb. 1, 2016, the disclosure and contents of which are incorporated by reference herein in their entirety.

BACKGROUND

Description of the Related Art

FSA-1 is a fines fixing agent containing a siloxane-based compound that is commercially available from Baker Hughes Incorporated. Improvements in this field of technology are desired.

SUMMARY

Disclosed herein are various illustrative embodiments of methods for improving the compatibility of a fines-fixing agent containing a siloxane-based compound with an organic complexed borate fracturing fluid. In certain illustrative embodiments, an acid can be added to the fines fixing agent such that the pH of the fines fixing agent is neutralized. The pH of the fines fixing agent can be reduced to 6 or lower. The acid can be one or more of hydrochloric acid and acetic acid. The siloxane-based compound can be aminoalkyl siloxane. The organic complexed borate fracturing fluid can be used in offshore completions.

Also disclosed herein are various illustrative embodiments of a fines-fixing agent. In certain illustrative embodiments, the fines-fixing agent can include a siloxane-based compound, an organic complexed borate fracturing fluid, and an acid, wherein the pH of the fines fixing agent is 6 or lower. The acid can be one or more of hydrochloric acid and acetic acid. The siloxane-based compound can be aminoalkyl siloxane.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION

Disclosed herein are various illustrative embodiments of a fines-fixing agent that has improved compatibility with organic complexed borate fracturing fluids. Also disclosed herein are various illustrative embodiments of methods for improving the compatibility of a fines-fixing agent.

FSA-1 is a fines fixing agent containing a siloxane-based compound that is available from Baker Hughes Incorporated. In certain illustrative embodiments, the siloxane-based compound is aminoalkyl siloxane.

FSA-1 chemistry can be reformulated such that it is more compatible with organo-borate crosslinkers combined with organic complexed borates (glyoxal). The product FSA-1 has a high concentration of unreacted caustic that results in a product pH of approximately 12. This high pH affects the crosslinker and the overall fracturing fluid system stability, promoting precipitation of the organic crosslinker.

In certain illustrative embodiments, these effects can be mitigated by neutralizing the FSA-1 product with an acid such as hydrochloric or acetic acid to a pH of 6 or lower. For example, the FSA-1 can be neutralized to a pH within a range of about 5-6 for improved compatibility with organic complexed borate fracturing fluids.

In certain illustrative embodiments, this new formulation specifically addresses compatibility issues with fracturing fluids used in offshore completions.

To facilitate a better understanding of the presently disclosed subject matter, the following examples of certain aspects of certain embodiments are given. In no way should the following examples be read to limit, or define, the scope of the presently disclosed subject matter.

Experiments were performed to determine the effectiveness of the presently disclosed subject matter.

Experiment 1

The objective of this experiment was to evaluate the chemistry of sample Y-20002, a modified FSA-1. Two batches, #400-116-1 with a pH of 8 and #400-116-2 with a pH of 5, were evaluated to determine compatibility with organo-borate crosslinkers containing glyoxal (XLW-24 available from Baker Hughes), described in detail in U.S. Pat. No. 5,160,643, the contents of which are incorporated by reference herein in their entirety. Once compatibility concerns between Y-20002 batches and the crosslinker were addressed, then evaluation of the crosslinked system utilizing organic complexed borate was performed.

Figure 1:
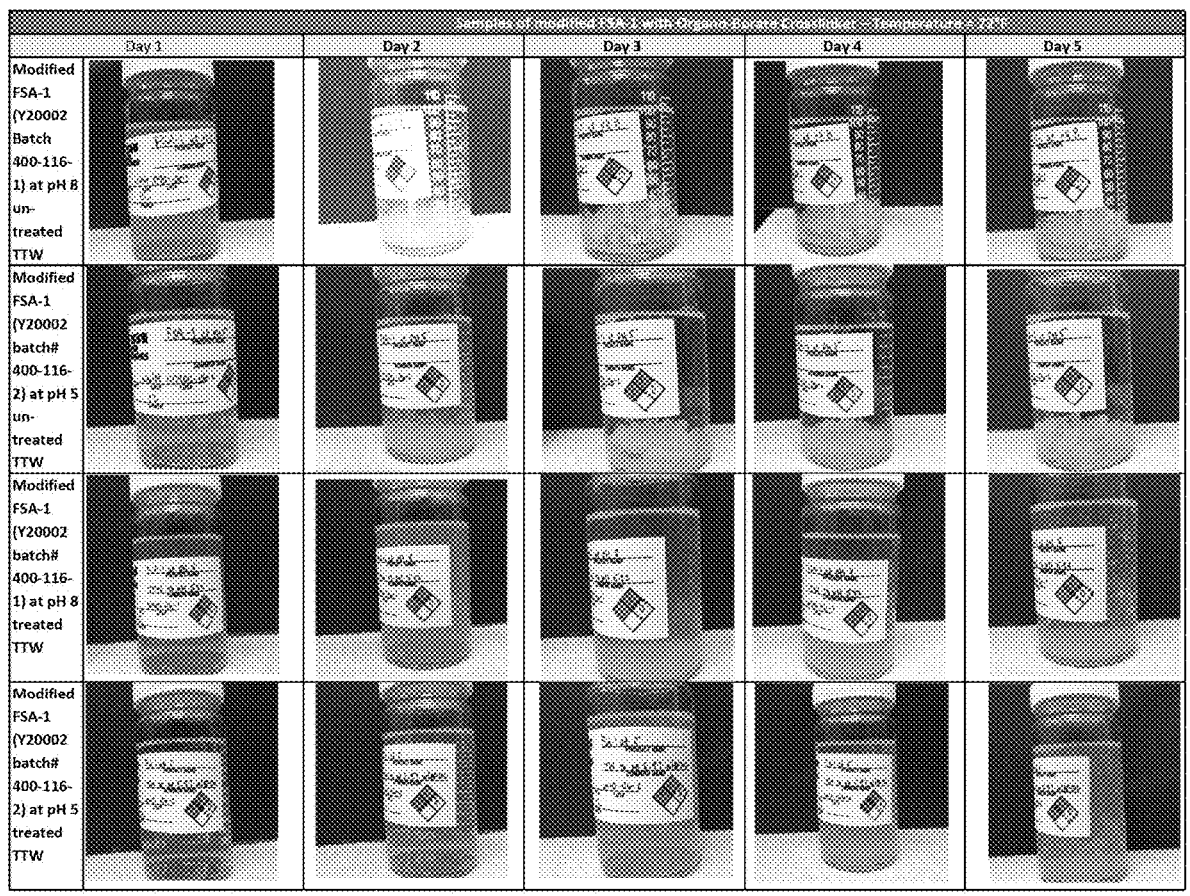
FIG. 1 is a collection of images of compatibility test results for samples according to embodiments of the present disclosure.

Compatibility was visually observed. Compatibility test temperature was 72° F. Table 1 compares the reactions of 5 gpt (gallons per thousand gallons) Y-20002 batch #400-116-1 or batch #400-116-2, and 3 gpt organo-borate crosslinker when combined in Tomball tap water (TTW). The samples were observed for five days and are displayed in the photographs of FIG. 1.

TABLE 1

Sample Y-20002 Compatibility with Organo-Borate Crosslinker
Tomball Tap Water + 5 gpt FSA-1 + 3 gpt XLW-24
Temperature = 72° F.

| pH | | | | Elasped Time | | | | |
|---|---|---|---|---|---|---|---|---|
| Tomball Tap Water | Modified FSA-1 | Initial | 10 minutes | 1 Day | 2 Days | 3 Days | 4 Days | 5 Days |
| Untreated: pH 7.95 | Batch #400-116-1 pH 7.96 | Cloudy | Cloudy | Precipitate | Precipitate | Precipitate | Precipitate | Precipitate |
| | Batch #400-116-2 pH 4.85 | Cloudy | Cloudy | Precipitate | Precipitate | Precipitate | Precipitate | Precipitate |
| Buffered: pH 6.1 | Batch #400-116-1 pH 7.96 | Clear | Clear | Clear | Clear | Cloudy | Cloudy | Precipitate |
| | Batch #400-116-2 pH 4.85 | Clear | Clear | Cloudy | Cloudy | Precipitate | Precipitate | Precipitate |

Water became cloudy when organo-borate crosslinker was added to the samples Y-20002 #400-116-1 at pH 8 and Y-20002 #400-116-2 at pH 5. Low pH buffer was used to decrease the pH of Tomball tap water to a pH of 6.1 prior to the addition of modified FSA-1 and organo-borate crosslinker. There was no initial reaction when Y-20002 #400-116-1 or Y-20002 #400-116-2 in treated Tomball tap water was combined with organo-borate crosslinker. However, within five days of testing a precipitate was visible in all tests.

For rheology testing, all fracturing fluids were prepared by first hydrating 1 liter of linear guar gel fluid for 30 minutes, using a standard Servodyne mixer with a high efficiency paddle at 1000 rpm. The fluid is composed of the following additives all available from Baker Hughes: 3 to 7% KCl, potassium chloride salt, GW-3LE, high yield guar slurry, Clay Master 5C, permanent clay stabilizer, NE-940, non-emulsifier, LT-32, Load recovery surfactant, BF-7L, high pH buffer and XLW-24, organo-borate crosslinker. The following formulations apply to the corresponding figures:

For 180° F. tests Tomball Tap water: 9.35 gpt GW-3LE; 1.0 gpt Clay Master 5C; 2.0 gpt NE-940; 1.0 gpt LT-32; 4.0 gpt BF-7L; and 2.0 gpt XLW-24.

For 230° F. tests Tomball Tap water: 9.35 gpt GW-3LE; 1.0 gpt Clay Master 5C; 1.0 gpt NE-940; 1.0 gpt LT-32; 7.0 gpt BF-9L; and 3.0 gpt XLW-24.

The fluid was crosslinked and then loaded into a high temperature high pressure rheometer. The fluid was initially run through a shear rate sweep of 100, 75, 50, and 25 $s^{-1}$ at ambient temperature to calculate the power law indices n' and K'. The fluid was then heated to the desired temperature and sheared at 100 $s^{-1}$ in-between shear rate sweeps. The shear rate sweep was repeated every 15 minutes for 2 hours 5 minutes then every 30 minutes for the next hour. A RIBS rotor-bob configuration was used.

Figure 2:
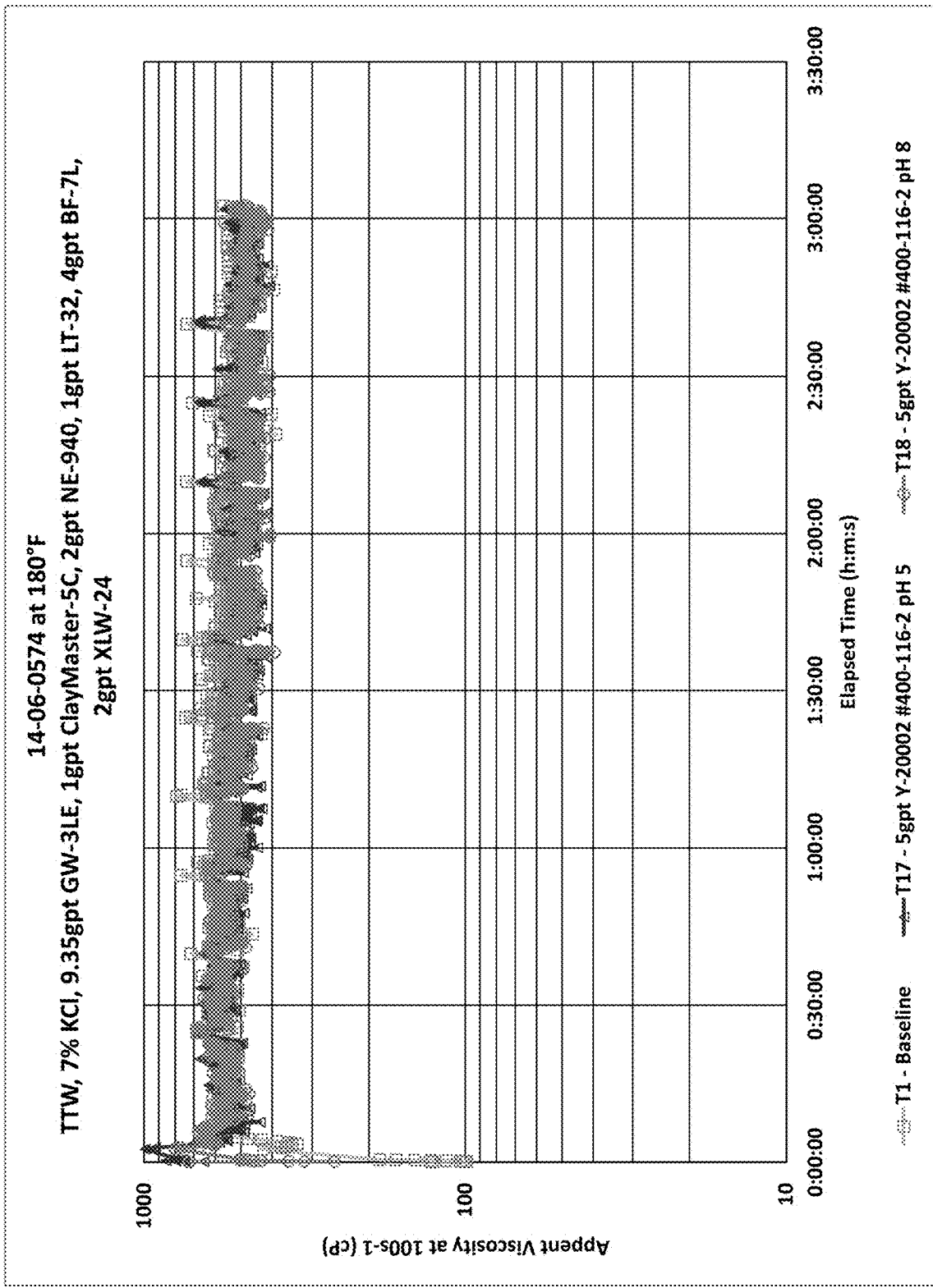
FIG. 2 is a graph showing apparent viscosity versus time for rheology test results according to embodiments of the present disclosure.
Figure 3:
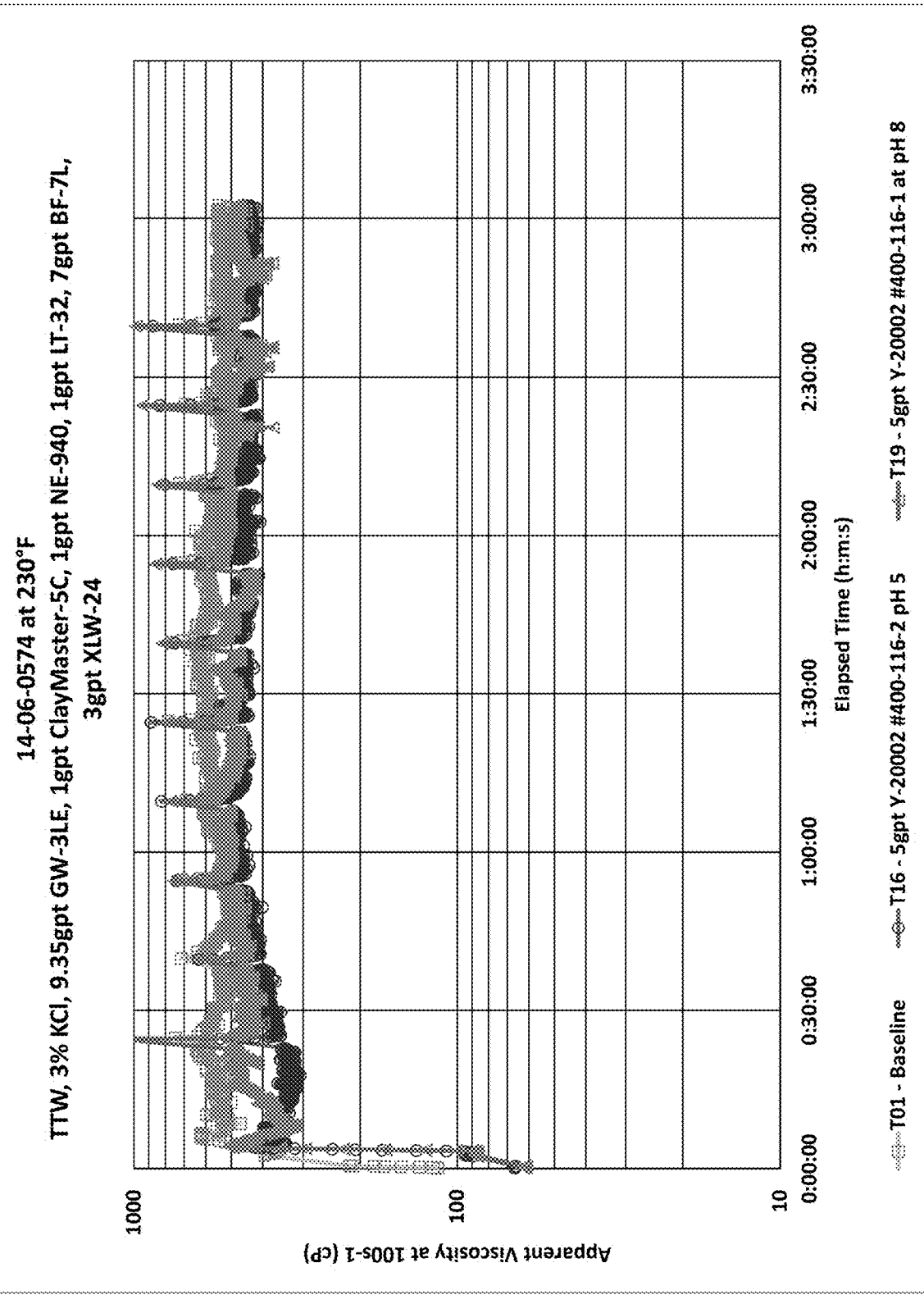
FIG. 3 is a graph showing apparent viscosity versus time for rheology test results according to embodiments of the present disclosure.

Rheology testing was conducted using two samples of modified FSA-1 (Y-20002) batch #400-116-1 and batch #400-116-2 in the organo-borate crosslinked system. Apparent viscosity versus time is represented in FIG. 2 and FIG. 3 herein. FIG. 2 displays fluid containing Y-20002 #400-116-1 or Y-20002 #400-116-2 testing at 180° F. FIG. 3 displays fluid containing Y-20002 #400-116-1 or Y-20002 #400-116-2 at 230° F. At 180° F. and 230° F., the addition of the modified FSA-1 does not affect viscosity significantly.

To summarize, apparent viscosity testing of sample Y-20002 #400-116-1 and sample Y-20002 #400-116-2 produced comparable results to the baseline at both 180° F. and 230° F. The modified FSA-1, Y-20002 #400-116-1 and Y-20002 #400-116-2 showed flocculation over time. These batches are not compatible with an organic complex borate fracturing fluid due to the flocculation at longer mixing times.

Experiment 2

The objective of this experiment was to evaluate chemistry to potentially reformulate FSA-1 to be compatible with organo-borate crosslinkers containing glyoxal. Once compatibility issues were resolved between FSA-1 and the crosslinker, rheology testing was performed. The optimum performance of fluid stabilization utilizing organic complexed borate fracture fluid was evaluated.

Testing was conducted by systematically reducing the pH of the FSA-1 with Hydrochloric Acid (HCl) then combining it with organo-borate crosslinker in Tomball Tap Water. Visual observations indicated that by reducing the pH of the FSA-1, it delayed or prevented any precipitation when combined with organo-borate crosslinker. When FSA-1 with a pH of 5.85 was mixed with organo-borate crosslinker in Tomball Tap Water, no reaction occurred within twelve days and the mix appeared stable. This pH range of modified FSA-1 was chosen for rheology testing on the Chandler 5550.

Table 2 compares the reaction of 5 gpt pH modified FSA-1 and 3 gpt organo-borate crosslinker when combined in Tomball Tap Water.

TABLE 2

Modified FSA-1 Compatibility with Organo-Borate Crosslinker
Tomball Tap Water + 5 gpt Modified FSA-1 + 3 gpt XLW-24
Temperature = 72° F.

| FSA-1 pH | Initial | 1 Day | 2 Days | 3 Days | 4 Days | 7 Days | 8 Days | 9 Days | 10 Days | 11 Days | 12 Days |
|---|---|---|---|---|---|---|---|---|---|---|---|
| pH 10.78 | Cloudy | Precipitate | Precipitate | Precipitate | Precipitate | Precipitate | Precipitate | Precipitate | Precipitate | Precipitate | Precipitate |
| pH 7.99 | Clear | Precipitate | Precipitate | Precipitate | Precipitate | Precipitate | Precipitate | Precipitate | Precipitate | Precipitate | Precipitate |
| pH 6.92 | Clear | Cloudy | Cloudy | Cloudy | Cloudy | Cloudy | Cloudy | Precipitate | Precipitate | Precipitate | Precipitate |
| pH 5.85 | Clear | Clear | Clear | Clear | Clear | Clear | Clear | Clear | Clear | Clear | Clear |

Figure 4:
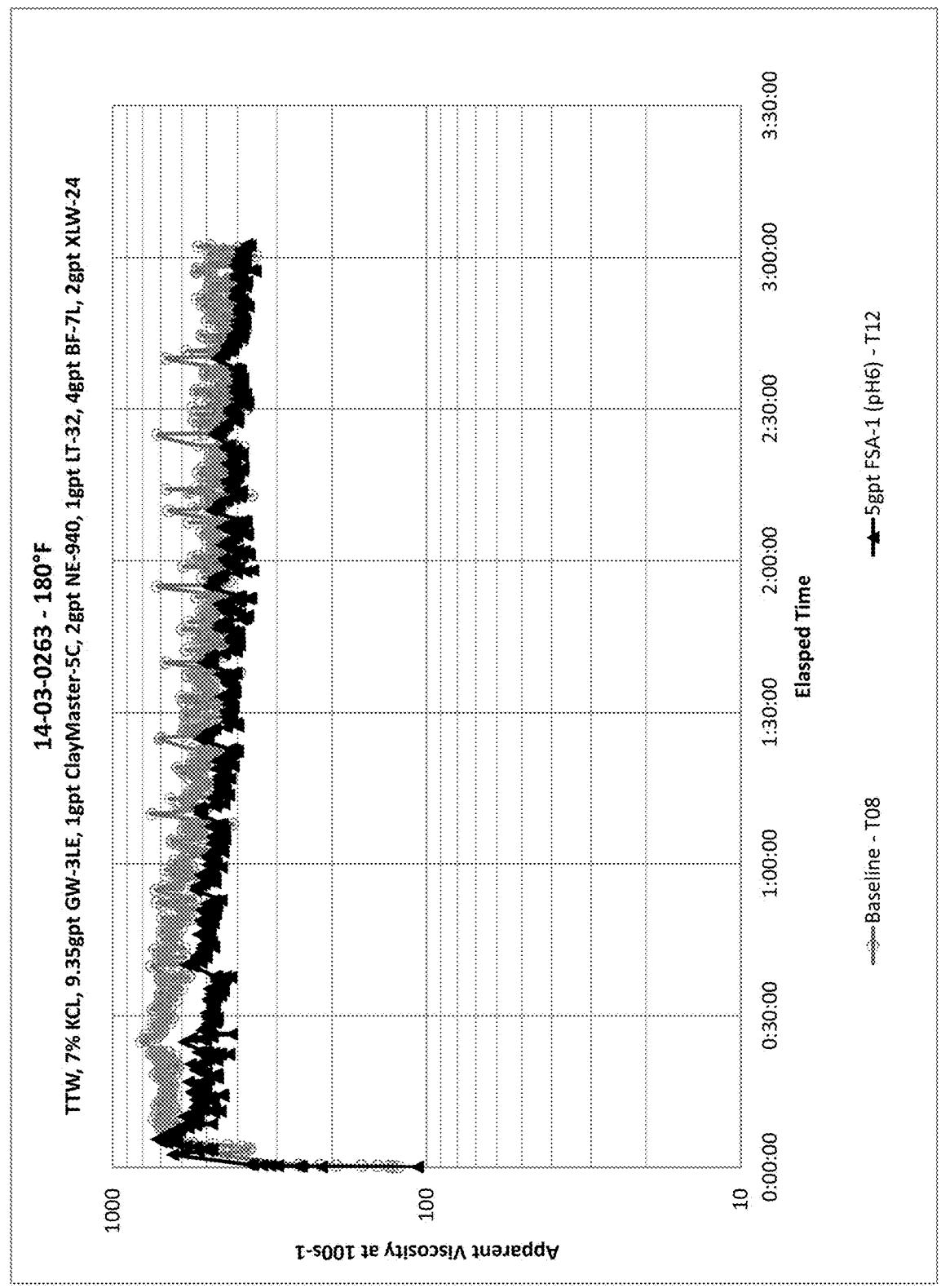
FIG. 4 is a graph showing apparent viscosity versus time for rheology test results according to embodiments of the present disclosure.
Figure 5:
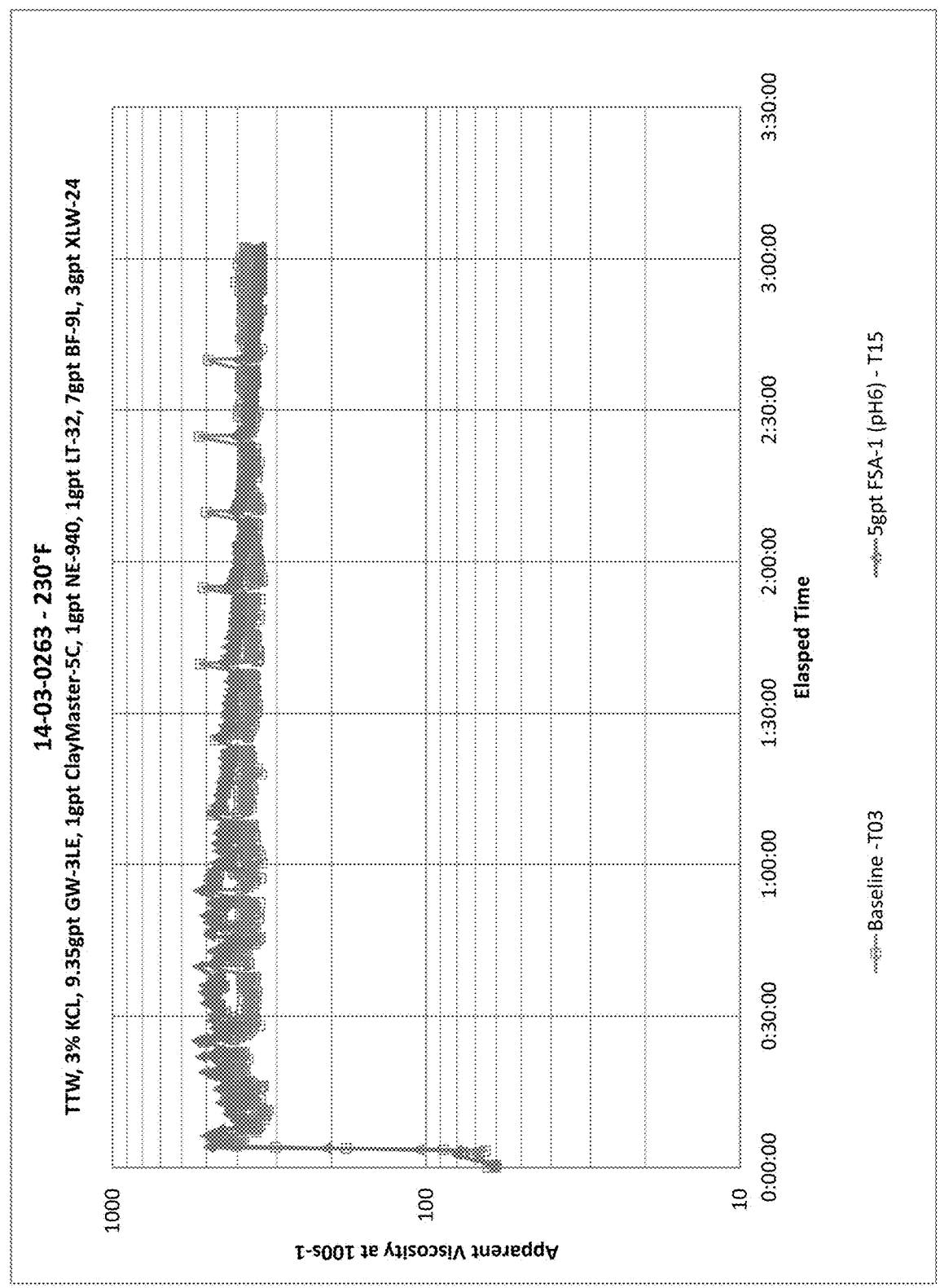
FIG. 5 is a graph showing apparent viscosity versus time for rheology test results according to embodiments of the present disclosure.

Rheology testing was conducted at 180° F. and 230° F. using modified FSA-1 (reduced to pH 6). Apparent viscosity versus time at 180° F. is displayed in FIG. 4 herein, while apparent viscosity versus time at 230° F. is displayed in FIG. 5 herein.

For rheology testing, all fracturing fluids were prepared by first hydrating 1 liter of linear guar gel fluid for 30 minutes, using a standard Servodyne mixer with a high efficiency paddle at 1000 rpm. The fluid is composed of the following additives all available from Baker Hughes: 3 to 7% KCl, potassium chloride salt, GW-3LE, high yield guar slurry, Clay Master 5C, permanent clay stabilizer, NE-940, non-emulsifier, LT-32, Load recovery surfactant, BF-7L, high pH buffer and XLW-24, organo-borate crosslinker. The following formulations apply to the corresponding figures:

For 180° F. tests Tomball Tap water: 9.35 gpt GW-3LE; 1.0 gpt Clay Master 5C; 2.0 gpt NE-940; 1.0 gpt LT-32; 4.0 gpt BF-7L; and 2.0 gpt XLW-24.

For 230° F. tests Tomball Tap water: 9.35 gpt GW-3LE; 1.0 gpt Clay Master 5C; 1.0 gpt NE-940; 1.0 gpt LT-32; 7.0 gpt BF-9L; and 3.0 gpt XLW-24.

The fluid was crosslinked and then loaded into a high temperature high pressure rheometer. The fluid was initially run through a shear rate sweep of 100, 75, 50, and 25 $s^{-1}$ at ambient temperature to calculate the power law indices n' and K'. The fluid was then heated to the desired temperature and sheared at 100 $s^{-1}$ in-between shear rate sweeps. The shear rate sweep was repeated every 15 minutes for 2 hours 5 minutes and then every 30 minutes for the next hour. A RIBS rotor-bob configuration was used.

To summarize, apparent viscosity testing was conducted using FSA-1 with a pH of 5.85. This pH version of FSA-1 was selected for further optimization since it showed no visible precipitates when mixed with an organo-borate crosslinker.

Experiment 3

The objective of this experiment was to evaluate the chemistry of sample Y-20029, reformulated FSA-1. Two batches, #400-121-1 (pH 5.28) and #400-121-2 (pH 5.28), were submitted to determine compatibility with organo-borate crosslinker. Once visual compatibility issues were determined between modified FSA-1 and the crosslinker, rheology testing was performed.

Table 3 displays the compatibility testing of 5 gpt Y-20029 batch #400-121-1 (pH 5.28) and batch #400-121-2 (pH 5.01) and 3 gpt organo-borate crosslinker when combined in Tomball Tap Water.

TABLE 3

Sample Y-20029 Compatibility with Organo-Borate Crosslinker
Tomball Tap Water + 5 gpt Reformulated FSA-1 + 3 gpt XLW-24
Temperature = 72° F.

| Modified FSA-1 | pH | Day 1 | Day 2 | Day 3 | Day 4 | Day 8 |
| --- | --- | --- | --- | --- | --- | --- |
| Batch 400-121-1 | pH 5.28 | Clear | Lightly Cloudy | Precipitate | Precipitate | Precipitate |
| Batch 400-121-2 | pH 5.01 | Clear | Clear | Clear | Lightly Cloudy | Cloudy |

Figure 6:
FIG. 6 is a collection of images of compatibility test results for samples according to embodiments of the present disclosure.

Initially, no chemical reactions were observed when either batch of modified FSA-1 was combined with organo-borate crosslinker. The mixture containing sample Y-20029 batch #400-121-1 (pH 5.28) did not precipitate until the third day. The mixture containing sample Y-20029 batch #400-121-2 (pH 5.01) did not precipitate within 8 days. Photos were taken and can be found in FIG. 6 herein.

For rheology testing, all fracturing fluids were prepared by first hydrating 1 liter of linear guar gel fluid for 30 minutes, using a standard Servodyne mixer with a high efficiency paddle at 1000 rpm. The fluid is composed of the following additives all available from Baker Hughes: 3 to 7% KCl, potassium chloride salt, GW-3LE, high yield guar slurry, Clay Master 5C, permanent clay stabilizer, NE-940, non-emulsifier, LT-32, Load recovery surfactant, BF-7L, high pH buffer and XLW-24, organo-borate crosslinker. The following formulations apply to the corresponding figures:

For 180° F. tests Tomball Tap water: 9.35 gpt GW-3LE; 1.0 gpt Clay Master 5C; 2.0 gpt NE-940; 1.0 gpt LT-32; 4.0 gpt BF-7L; and 2.0 gpt XLW-24.

For 230° F. tests Tomball Tap water: 9.35 gpt GW-3LE; 1.0 gpt Clay Master 5C; 1.0 gpt NE-940; 1.0 gpt LT-32; 7.0 gpt BF-9L; and 3.0 gpt XLW-24.

The fluid was crosslinked and then loaded into a high temperature high pressure rheometer. The fluid was initially run through a shear rate sweep of 100, 75, 50, and 25 $s^{-1}$ at ambient temperature to calculate the power law indices n' and K'. The fluid was then heated to the desired temperature and sheared at 100 $s^{-1}$ in-between shear rate sweeps. The shear rate sweep was repeated every 15 minutes for 2 hours 5 minutes then every 30 minutes for the next hour. A RIBS rotor-bob configuration was used.

Figure 7:
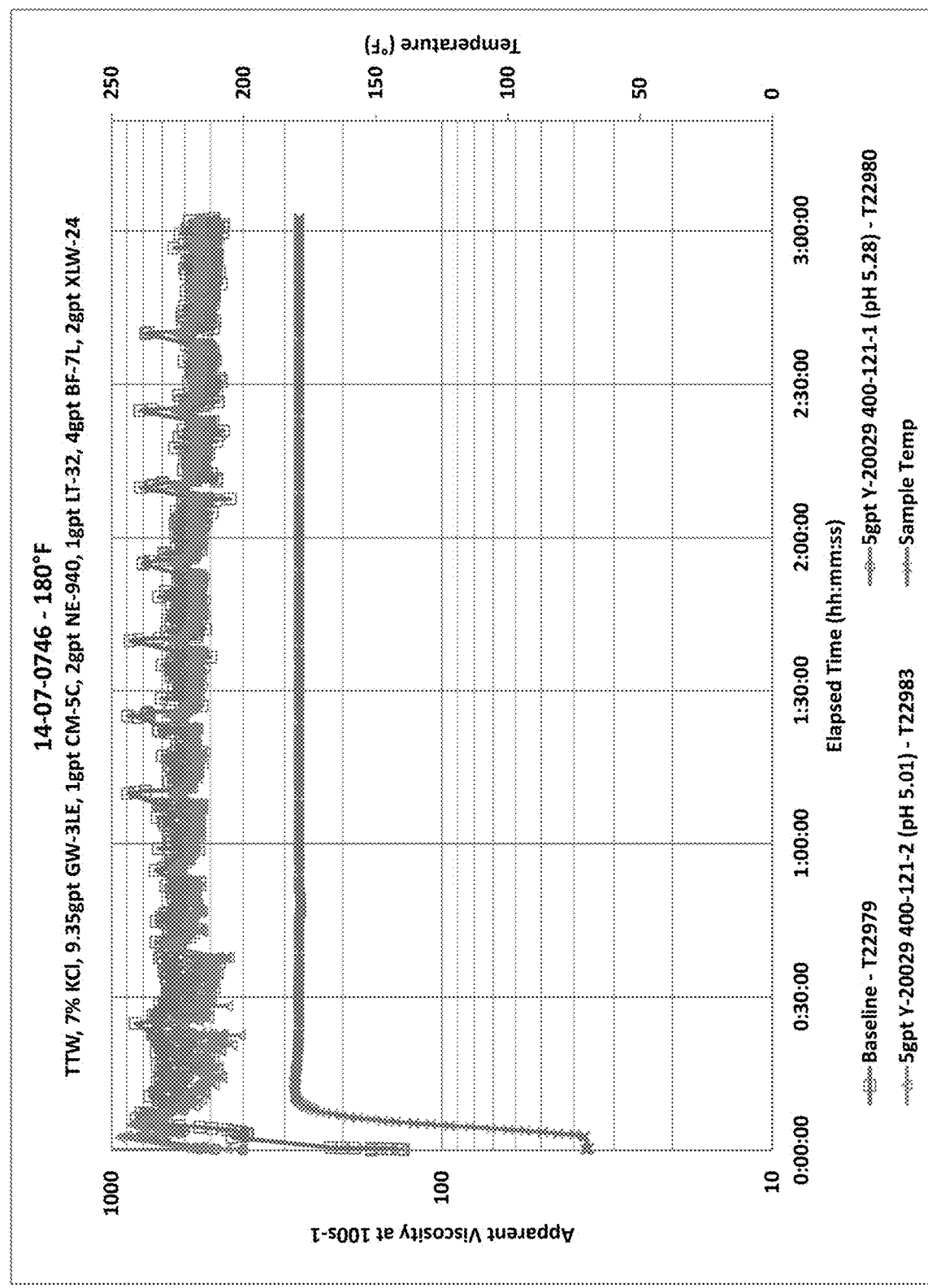
FIG. 7 is a graph showing apparent viscosity versus time for rheology test results according to embodiments of the present disclosure.
Figure 8:
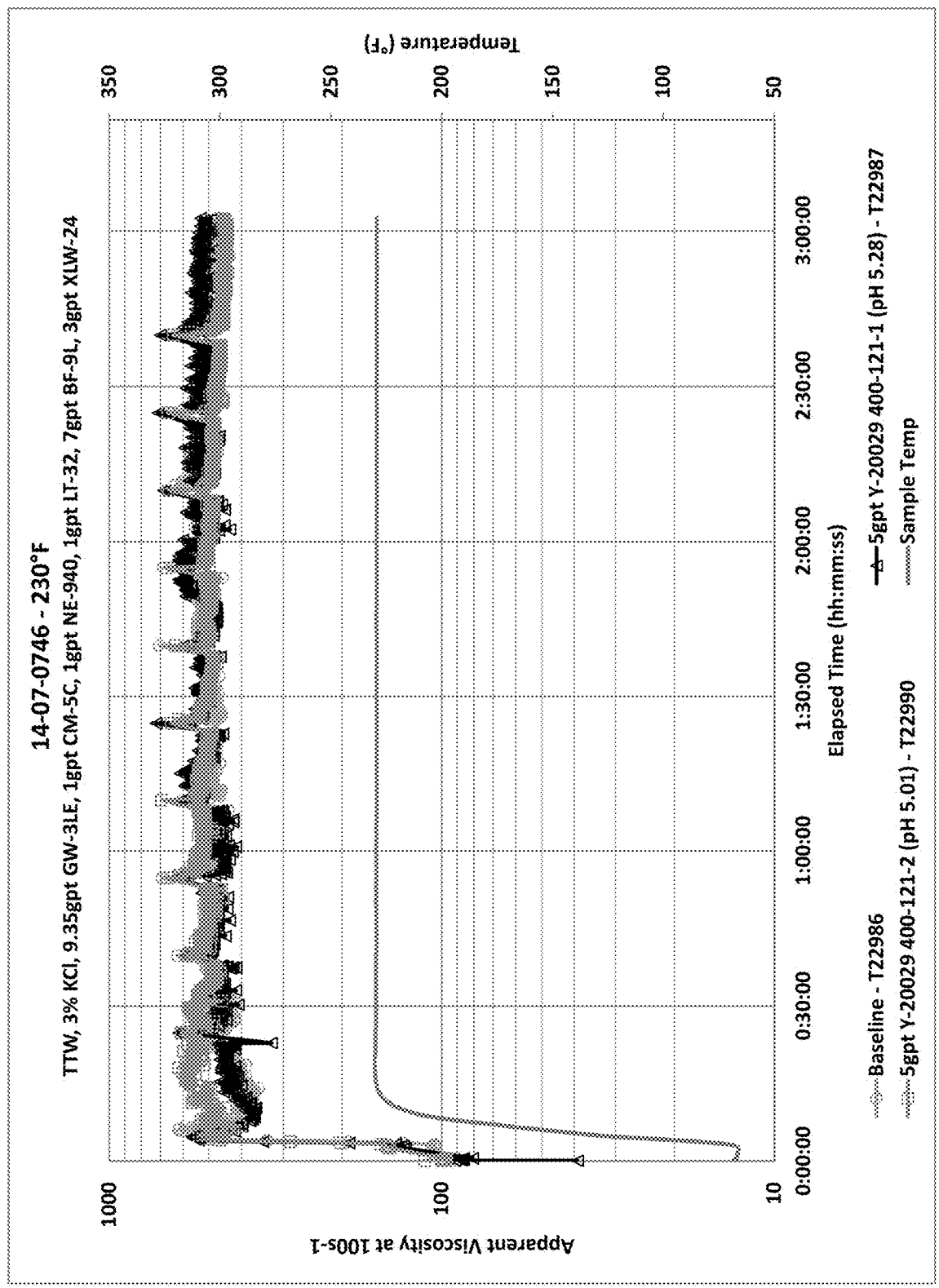
FIG. 8 is a graph showing apparent viscosity versus time for rheology test results according to embodiments of the present disclosure.

FIGS. 7 and 8 display comparable fluid stability containing 5 gpt sample Y-20029 batch #400-121-1 (pH 5.28) or batch #400-121-2 (pH 5.01) when compared to the organic complexed borate fluid baseline formulation at 180° F. FIG. 7 displays apparent viscosity versus time at 180° F. FIG. 8 displays apparent viscosity versus time at 230° F.

To establish that the reformulated FSA-1 remained effective in stabilizing silica fines, critical velocity testing was performed. A synthetic core sample was assembled using 80% 100 mesh white sand and 20% 325 mesh silica flour. The mixture was wetted with 2% KCl solution then packed into a metal foil cylinder. Small mesh screens were placed on each end to prohibit grain loss. The assembly was subjected to minimal confining pressure to seat the metal to the sand, thereby avoiding fluid bypass.

The fluid was prepared by mixing 5 gpt FSA-1 or modified FSA-1 (sample Y-20029, batch #400-121-2) and 3 gpt organo-borate crosslinker in a 2% Potassium Chloride (KCl) solution. The mixtures were allowed to set overnight prior to use. The FSA-1 mixture was grossly filtered to remove precipitated material.

The assembled sample was evacuated under the prepared fluid, then placed in a hydrostatic-load coreholder and confining pressure was applied. The previously prepared fluid was injected against backpressure at incrementally increasing flow rates. Differential pressure was monitored and the specific permeability to water (Kw) was calculated.

Figure 9:
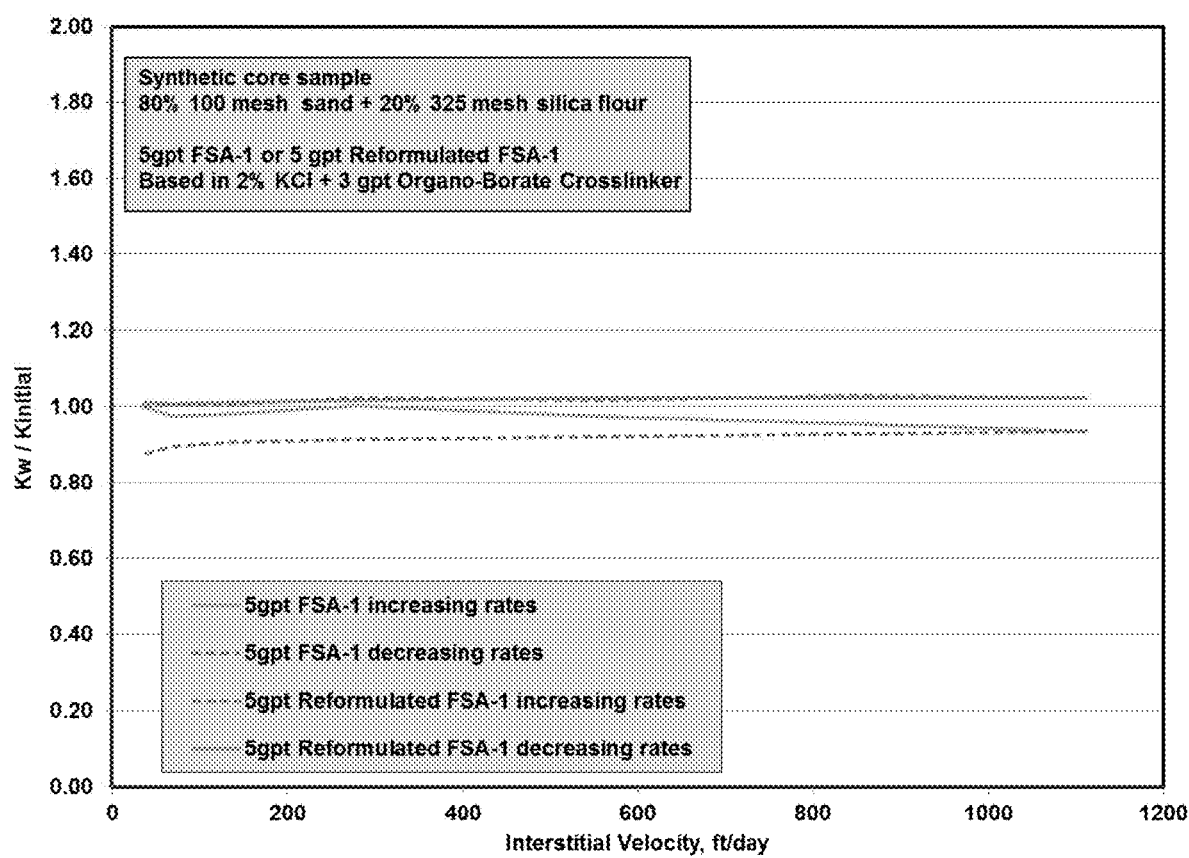
FIG. 9 is a graph showing apparent viscosity versus time for rheology test results according to embodiments of the present disclosure.

FIG. 9 displays critical velocity results, using a 2% potassium chloride solution containing original or reformulated FSA-1, in combination with organo-borate crosslinker. Results are normalized to the initial specific Kw. Results indicate that the filtered original FSA-1 version allowed permeability reduction due to fines movement and that the fines movement appears permanent. Reformulated FSA-1 version retained the fines fixing aspect of the formulation.

To summarize, rheology testing of sample Y-20029 batches #400-121-1 and sample Y-20029 #400-121-2 displayed comparable fluid performances to the organic complexed borate fluid baselines at 180° F. and 230° F. Sample Y-20029 batch #400-121-1 precipitated within 3 days of mixing with organo-borate crosslinker containing glyoxal. Sample Y-20029 batch #400-121-2 did not precipitate within 8 days of mixing with the same crosslinker. Sample Y-20029 batch #400-121-1 sample is not compatible with organic complexed borate fracture fluid due to the flocculation and did not progress further. In critical velocity testing, Sample Y-20029 batch#400-121-2 retained the fines fixing aspect intended by the product FSA-1.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter. Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the appended claims.

What is claimed is:

1. A method of minimizing precipitation of a fines fixing agent containing a siloxane-based compound when the fines fixing agent is added to an organic complexed borate fracturing fluid, the method comprising:
    adding an acid to the fines fixing agent such that the pH of the fines fixing agent is reduced to obtain an acid-treated fines fixing agent, and
    adding the acid-treated fines fixing agent to the organic complexed borate fracturing fluid and minimizing the precipitation of the fines fixing agent therein,
    wherein the acid is added to the fines fixing agent prior to combining the fines fixing agent with the organic complexed borate fracturing fluid.

2. The method of claim 1, wherein the pH of the fines fixing agent is reduced to 6 or lower.

3. The method of claim 1, wherein the pH of the fines fixing agent is reduced to a range from 5-6.

4. The method of claim 1, wherein the acid is hydrochloric acid.

5. The method of claim 1, wherein the organic complexed borate fracturing fluid comprises glyoxal.

6. The method of claim 1, wherein the acid is added directly to the fines fixing agent.

7. The method of claim 1, wherein the siloxane-based compound is aminoalkyl siloxane.

* * * * *